United States Patent [19]

Cardoza et al.

[11] 4,428,037
[45] Jan. 24, 1984

[54] VERSATILE LIGHTING BAR WITH DISSIMILAR ROTATABLE LIGHTS

[76] Inventors: Albert C. Cardoza, 1083 N. Terrace Dr., Colton, Calif. 92324; Von M. Dawley, 140 E. 18th St., San Bernardino, Calif. 92404; Edgardo C. Diaz, 1066 Buston Dr., Rialto, Calif. 92376; Michael E. Edson, 35240 San Pablo Dr.; Jerry J. Nelson, 12343 Custer St., both of Yucaipa, Calif. 92399; Robert D. Peters, 17821 Ivy Ave., Fontana, Calif. 92335; Dennis R. Wear, 231 W. 17th St., San Bernardino, Calif. 92405; Daniel H. Wier, 35925 Andes Way, Yucaipa, Calif. 92399

[21] Appl. No.: 433,978

[22] Filed: Oct. 13, 1982

[51] Int. Cl.³ .............................................. F21V 21/26
[52] U.S. Cl. ...................... 362/250; 362/61; 362/269; 362/80; 362/427; 362/184; 362/190; 362/430; 362/191; 362/431
[58] Field of Search ............... 362/16, 184, 185, 190, 362/191, 61, 80, 243, 249, 431, 269, 427, 430

[56] References Cited

U.S. PATENT DOCUMENTS

| | | | |
|---|---|---|---|
| 3,460,728 | 8/1969 | Adamson | 362/80 X |
| 3,885,146 | 5/1975 | Whitley, Jr. | 362/294 X |
| 3,995,250 | 11/1976 | Ferree | 362/431 X |
| 4,181,928 | 1/1980 | Zelina | 362/243 X |
| 4,192,427 | 3/1980 | Bergmann | 362/61 X |
| 4,228,489 | 10/1980 | Martin | 362/431 X |
| 4,286,309 | 8/1981 | Rasinski | 362/61 |
| 4,319,306 | 3/1982 | Stanuch | 362/294 X |
| 4,363,084 | 12/1982 | Dimiceli | 362/431 X |

Primary Examiner—Peter A. Nelson
Attorney, Agent, or Firm—Bruce L. Birchard

[57] ABSTRACT

By providing, for use in a repair-truck installation, a lighting bar including the combination of a lamp having a rectangular, spreading beam with a lamp having a round flooding beam, the combination being supported rotatably from a pole which is attachable to a truck on which the combination is being carried, displacing the lamp with the rectangular, spreading beam from the axis of the vertical supporting pole by a distance sufficient to permit the rectangular beam to illuminate a significantly large work area local to the truck while the lamp with the round beam is supported at a lesser distance from such axis to permit illumination of a work area remote from the truck, repair work, for example on a remote gas meter may be conducted simultaneously with related preparatory work at the truck without light switching or transporting, thus increasing the efficiency of the repair personnel and the accuracy of their work.

2 Claims, 1 Drawing Figure

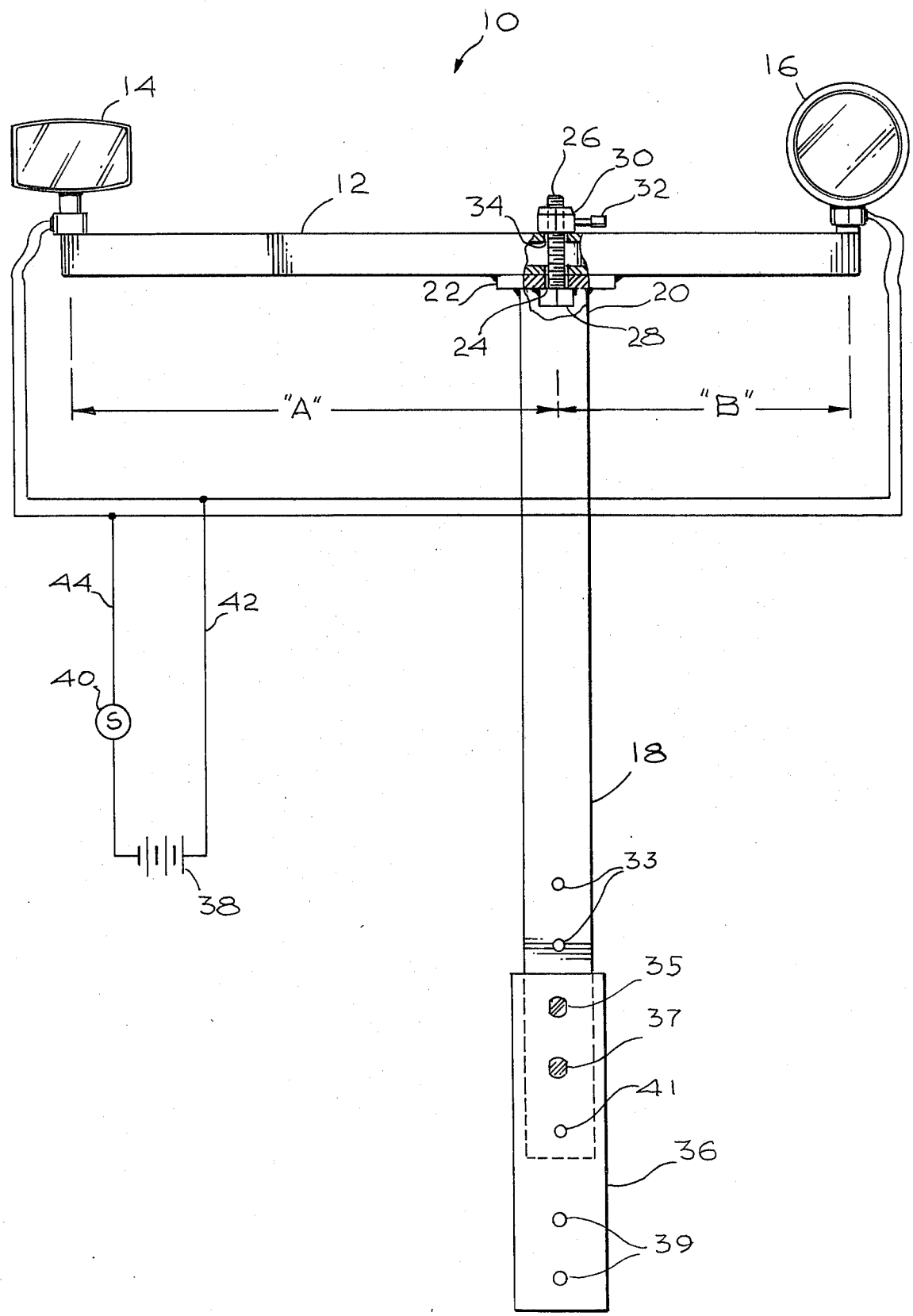

VERSATILE LIGHTING BAR WITH DISSIMILAR ROTATABLE LIGHTS

BACKGROUND OF THE INVENTION

1. Field of the Invention

This invention relates to the field of lighting equipment and more particularly to light bars for use in emergency repair situations.

2. Prior Art

A search of prior art patents in the U.S. Patent Office revealed a number of patents related to lighting bars. The patents which were found were:

U.S. Pat. No. 2,165,562 (Mack, et al)
U.S. Pat. No. 3,586,852 (Bradley)
U.S. Pat. No. 4,181,929 (Barber)
U.S. Pat. No. 4,228,489 (Martin)

None of the patents showed the combination of a rectangular beam lamp and a round beam flood lamp to permit simultaneous remote and local illumination, which is particularly useful in emergency repair situations.

For example, when a utility, such as one providing natural gas for home heating purposes, receives an emergency call that requires replacing or repairing the gas or other meter, it is not infrequent that work must be done at night.

Under those conditions a repair truck with an appropriate number of service personnel is sent to the repair site. Before a replacement service can be installed, or while a service is being repaired, on-site, work must be done both at the building where the meter is and at the truck itself, where certain tools and a convenient working area are available. The source of illuminating power is the truck battery. It has limited storage capacity and the use of its stored energy must be efficient. Simply having one large light does not meet the requirements of efficiency and effective lighting of both sites. Two round beam flood lights, one aimed at the meter and the other at the truck work-site does not meet the requirement of efficient use of the stored electrical energy.

Therefore, it is an object of this invention to overcome the limitations of the prior art device.

It is a further object of this invention to provide a lighting bar which permits simultaneous and efficient local and remote illumination, particularly for emergency repair situations.

SUMMARY OF THE INVENTION

Stated succinctly, the lighting bar according to this invention comprises a first lamp having a rectangular, spreading beam and a second lamp having a round, flooding beam, the two lamps being supported on a cross-bar which is rotatably supported from a vertical pole or pedestal, the lamp with the rectangular, spreading beam being further from the vertical pole than the lamp with the round, flood beam, the vertical pole being adapted for mounting on a repair truck, an easily operable lock being provided to cause locking, in a predetermined position, of the orientation of the horizontal bar supporting the two lamps.

BRIEF DESCRIPTION OF THE DRAWINGS

The sole FIGURE is a schematic drawing of a lighting bar structure according to the present invention.

DETAILED DESCRIPTION OF THE PREFERRED EMBODIMENT

In the sole FIGURE, lighting bar assembly 10 includes horizontal arm 12, which may be made of square-walled tubing, 1½ inches on a side. At one end of arm 12 there is supported lamp 14 which has a square or rectangular beam. Lamp 14 may be a 50 watt tractor lamp with a reflector causing a rectangular or "square" beam which may be directed towards a work-site local to the service truck and will have a maximum amount of spreading so as to give illumination over a wide work area proximate to the truck.

At the other end of arm 12 there is supported a second lamp 16 which has a round, flood beam as a result of the spherical nature of its reflector. The purpose of lamp 16 is to illuminate the work area remote from the lighting bar assembly 10. Lamp 16 may be a 35-watt tractor lamp with a round, flood beam.

Pole or pedestal 18 is provided to support arm 12 and lamps 14 and 16. At the upper end 20 of pole 18, a support plate 22 is provided. Plate 22 may be welded to pole 18. Plate 22 has an opening 24 therethrough to permit passage of threaded bolt 26. The lower end of threaded bolt 26 cooperates with the inner threads in nut 28, and bottoms in that nut, nut 28 being affixed to the lower surface of plate 22 in alignment with hole or opening 24 in plate 22. The upper end of threaded bolt 26 is in cooperative engagement with the inner threads in upper nut 30. A pin 32 is provided for rotating nut 30. Bolt 26 passes freely through opening 34 in arm 12. Thus, arm 12 may be rotated freely unless nut 30 is in firm engagement with it, in which case arm 12 is in a locked position.

Opening 34 in arm 12 is located off the center of arm 12. Thus, if mounting plate 36, which is permanently affixed to the lower end of pole 18, is mounted at one corner of a repair truck, for example, arm 12 may be rotated so that lamp 14, which is intended to illuminate a local work-site, illuminates a maximum desired work area proximate to the service truck. Dimension "A" in the sole FIGURE, may be 13 inches, for example, whereas dimension "B" in that figure may be 7 inches. The length of pole or pedestal 18 may be 42 inches, for example. Pole 18 nests or telescopes in support 36 and is held at the desired height by bolts 35 and 37 which pass thru aligned openings 41, in support 36, and corresponding opposite openings, such as opening 33, in pole 18. Support base 36 may be attached to the service truck by bolts passed thru openings 39. Lamp 14 is thus available to illuminate a work area at the truck while lamp 16 illuminates the remote work area, both with maximum energy efficiency.

Lamp 16 can rotate through a full 360° in the horizontal plane. Lamp 14 rotates only 180° in the horizontal plane but also rotates in the vertical plane.

The source of the energy to operate lamps 14 and 16 is the truck battery (or an auxiliary battery) 38 which is coupled through switch 40 and connectors 42 and 44, to lamp connectors 46 and 48, respectively, the latter feeding electrical energy from battery 38 to both of lamps 14 and 16, in parallel.

Thus, there has been provided a lighting bar which permits simultaneous illumination of a remote and a local work-site, with maximum energy efficiency and maximum versatility of operation.

While a particular embodiment of this invention has been shown and described, it will be apparent to those skilled in the art that variations and modifications may be made therein without departing from the spirit and scope of this invention. It is the purpose of the appended claims to cover all such variations and modifications.

What is claimed is:

1. A lighting bar including:

an arm intended in use to be horizontal;

first and second electric lamps supported from said arm proximate the opposite extremities thereof;

said first electric lamp having, in operation, a beam of rectangular cross-section;

said second electric lamp having, in operation, a beam of circular cross-section;

a pole intended, in use, to be vertical;

coupling means, said coupling means including a plate secured, in a horizontal position, to the upper end of said pole and having an opening therein, centrally thereof;

a vertically disposed threaded shaft fixedly connected to said plate, passing thru said opening in said plate and extending above said pole, said arm having a vertical opening therethru to receive said shaft freely, for rotation of said arm about said shaft, said vertical opening in said arm being positioned off the longitudinal center of said arm whereby there is a greater distance from said first lamp to said vertical opening than there is from said second lamp to said vertical opening;

a nut having internal threads sized and pitched to cooperate with said threaded shaft and positioned on said shaft on the opposite side of said arm from said plate, whereby said nut can be adjusted to cause said arm to forcefully engage said plate;

said nut having a horizontally-disposed setting-pin therein;

said first electric lamp being supported for rotation only in the horizontal plane but through 360° and said second electric lamp being supported for rotation through only 180° in the horizontal plane but is also rotatable in the vertical plane.

and means for providing electrical energy to said first and second electric lamps.

2. Apparatus according to claim 1 which includes, in addition, mounting means permanently connected to said pole for mounting said pole on a truck.

* * * * *